United States Patent [19]

Tazaki et al.

[11] Patent Number: 4,694,500

[45] Date of Patent: Sep. 15, 1987

[54] CONTROL VOLTAGE GENERATING CIRCUIT FOR ACTIVATING A NOISE REDUCTION CIRCUIT IN AN FM STEREO RECEIVER

[75] Inventors: Satoru Tazaki; Yasuhiro Yoshioka; Kiyoshi Amazawa, all of Tokyo, Japan

[73] Assignee: Clarion Co., Ltd., Tokyo, Japan

[21] Appl. No.: 834,980

[22] Filed: Feb. 28, 1986

[30] Foreign Application Priority Data

Mar. 6, 1985 [JP] Japan ................................ 60-42822

[51] Int. Cl.⁴ .............................................. H04H 5/00
[52] U.S. Cl. ......................................... 381/10; 381/13; 455/52; 455/65; 455/297
[58] Field of Search .......................... 455/52, 65, 297; 381/10, 11, 13

[56] References Cited

U.S. PATENT DOCUMENTS

| | | | |
|---|---|---|---|
| 4,244,056 | 1/1981 | Hamada et al. | 455/297 |
| 4,390,749 | 6/1983 | Pearson | 381/13 |
| 4,408,098 | 10/1983 | Kamalski | 381/13 |
| 4,612,662 | 9/1986 | Kuwajima et al. | 381/13 |
| 4,620,315 | 10/1986 | Imagawa | 381/13 |

Primary Examiner—Forester W. Isen
Attorney, Agent, or Firm—Flynn, Thiel, Boutell & Tanis

[57] ABSTRACT

A high-cut and high-blend control voltage generating circuit for activating a noise reduction circuit of an FM stereo receiver is configured to be simply responsive to multipath noises and never to plug noises. A changing and discharging circuit in the control voltage circuit may have a relatively long charging time constant, and the voltage control circuit may be configured to be simply responsive to multipath noises above a predetermined level. Thus the circuit is much less liable to operate erroneously.

5 Claims, 9 Drawing Figures

CONTROL VOLTAGE GENERATING CIRCUIT FOR ACTIVATING A NOISE REDUCTION CIRCUIT IN AN FM STEREO RECEIVER

FIELD OF THE INVENTION

This invention relates to a control voltage generating circuit for activating a noise reduction circuit in an FM stereo receiver, particularly for use in a car.

BACKGROUND OF THE INVENTION

As a car moves, there occurs continuous changes in the relationship between direct waves from a broadcasting station and indirect waves reflected by mountains and buildings. When the relationship meets a certain condition, a multipath distortion occurs due to interference between the direct waves and indirect, reflected waves. The multipath distortion is one of serious problems of a car-use FM tuner.

The multipath distortion causes multipath noises to appear in audio outputs and significantly degrade the reproduced sound. There are two prior art countermeasures against the multipath distortion. One of them is the use of two or more receivers in a single receiver system such as in a space diversity receiver system having two or more antennas to select one of entered signals through the antennas which include the least multipath distortion. The other countermeasure is the use of a circuit for alleviating the noise (i.e., the use of a signal-strength(S) meter voltage for high cut or high blend control of the stereo outputs).

Alleviation of multipath noises is taught by Japanese Patent Preliminary Publication No. 212830/1982. This publication teaches detection of multipath noises from a signal-strength meter to subsequently reduce the noises in the following two methods.

(a) Automatic Switching between monoral and stereo receptions (high blend control):

A noise in the monoral reception is about 20 dB smaller than a noise in the stereo reception. When the antenna input level decreases, and a noise in the stereo output becomes relatively large, the stereo reception is changed to the monoral reception to decreases the noise in the demodulated output to the noise level of the monoral reception.

(b) High band attenuation (high cut control):

Among all bands noise components, high band noise components in particular bother human ears. Therefore, when the noise is large, it is reduced by attenuating high band components in the demodulated output.

The aforegoing two methods are significantly effective against multipath noises. More specifically, since multipath distortion includes a lot of higher-order and higher-harmonic components, a substantial part of the distortion can be reduced in high demodulation frequencies by an emphasis circuit (circuit for effecting the high cut control). The aforegoing Japanese publication fixes a threshold level corresponding to a single diode to prevent erroneous operation of a noise reduction circuit. When the modulation signal frequency changes, an FH modulation wave changes in amplitude due to a side-lobe expansion caused by a change of the FM modulation ratio. A multipath detecting circuit detects the change in the amplitude as a multipath noise and produces a detection signal regardless of absence of multipath noises. Therefore, a high cut and high blend control is erroneously effected accordingly. To avoid this error, the aforegoing Japanese publication employs a diode, and fixes a threshold level so as to displace the detected level of the multipath noise by an amount corresponding to the forward voltage of the single diode. However, the threshold level is limited to the diode and cannot be selected freely. Further, since the time constant for charge and discharge in the noise reduction circuit against generation of multipath noises cannot be fixed independently, a limitation is imposed to the output response of the circuit against noises. Therefore, reproduced sound is hardly improved in regions where multipath noises are often generated.

The prior art system includes a negative-phase amplifier to amplify ripple components included in an S meter output voltage. The amplifier signal is negative rectified into a negative voltage, and the negative voltage is mixed with a d.c. voltage in the S meter output voltage into a resulting voltage which is used as a control voltage for control of the high cut and high blend operation.

FIG. 5 shows a circuit diagram of a noise reduction circuit disclosed by the aforegoing Japanese publication, wherein reference numeral 1 designates an input terminal in which an S meter output voltage $V_S$ is entered, and reference numeral 2 denotes an output terminal where a high cut and high blend control voltage $V_O$ appears.

When a multipath disturbance occurs, negative ripple components are included in the S meter output voltage. Additionally, noises such as plug noises normally appear as positive ripple components. FIG. 6 shows waveforms of the S meter output voltage upon multipath disturbance at (a) and upon plug noises at (b).

In the prior art arrangement of FIG. 5, ripple components in the S meter output voltage are amplified through the negative-phase amplifier comprising a transistor Tr, etc., and the amplified signal is negative rectified by diodes $D_1$ and $D_2$ into a d.c. output voltage which is subsequently mixed with the d.c. components in the S meter output voltage into a resulting voltage used as the high-cut and high-blend control voltage $V_O$. More specifically, when multipath noises are generated, ripple components caused by the multipath noises in the S meter output voltage are positively inverted and amplified by the negative-phase amplifier.

Further, ripple components caused by plug noises are negative rectified to negatively charge the capacitor $C_3$. Actually, since a coupling capacitor $C_1$ forms a differential circuit, positive ripple components appear in the base input waveform of the transistor Tr regardless of negative ripple components generated during multipath disturbance. Therefore, multipath noises are negative rectified, too. The aforegoing circuit is low in sensitivity to multipath noises, but high to plug noises.

The circuit of FIG. 5 operates as follows.

The capacitor $C_4$ is charged to a potential $V_1$ via a resistor $R_6$. multipath or other noises are generated, the potential of the capacitor $C_3$ decreases. When the potential becomes below the forward voltage $V_F$ of the diode $D_3$, the capacitor $C_4$ discharges so as to elevate the potential of the capacitor $C_3$ through the diode $D_3$ and resistor $R_5$. Further, an electric current flows through the resistor $R_6$ to charge the capacitor $C_4$. The charging current to the capacitor $C_4$ drops the potential $V_1$. This is the theory of the circuit of FIG. 5. The charging time constant $T_1$ is determined by $C_4R_6$, and the discharging time constant $T_2$ by $C_4R_5$. Discontinuous impression of the sound quality due to multipath noises is significantly reduced by an appropriate value of the charging and discharging time constants. An ideal value of the charging time constant $T_1$ is about 10 seconds. However, in the prior art system it is requested that capacitor $C_4 = 1000$ μF and resistor $R_6 = 10$kΩ, for example, to obtain the charging time constant of 10 seconds. Since the value of the resistor $R_6$ is not increased so much, the capacitor must be significantly large. Therefore, the prior art system is disadvantageous in the manufacturing cost and space saving of the circuit. Further, a dead zone for inactivating the aforegoing circuit during small or modest multipath noises can be selected by appropriate selection of the value of the resistor $R_1$ but is limited to an extent.

As described, the prior art control voltage generating circuit for activating the noise reduction circuit in an FM receiver is not so sensitive to multipath noises and rather sensitive to plug noises. More specifically, all the while that plug noises are generated, the high cut and high blend control voltage drops, and the control voltage generating circuit is activated to remove high frequency components from stereo demodulated signal outputs even if multipath noises are not generated. Additionally, since the charging time constant cannot be longer than about 10 seconds, the circuit is responsive too fast to a sudden change in the signal condition, which produces a discontinuous impression in the sound quality. Further, it has been difficult to provide a dead zone simply responsive to multipath noises above a predetermined level or to freely select the discharge amount of the capacitor upon reception of multipath noises of a predetermined level.

OBJECT OF THE INVENTION

It is therefore an object of the invention to provide a control voltage generating circuit for activating a noise reduction circuit in an FM stereo receiver which circuit is simply responsive to multipath noises and not to plug noises, so as to drop high frequency components simply on reception of multipath noises to avoid any incompatibility, and which circuit may have a relatively long capacitor charging time constant so as to establish a slow or modest response against a sudden change in the wave condition and seldom operate erroneously.

A further object of the invention to provide a control voltage generating circuit in which the discharge amount of a capacitor upon reception of multipath noises of a certain level may be selected freely, and the voltage for high-cut and high blend control may be selected as desired.

SUMMARY OF THE INVENTION

According to the present invention, there is provided a control voltage generating circuit for activating a noise reduction circuit in an FM stereo receiver, comprising:

an in-phase amplifier in which negative ripple components in an S meter output voltage obtained from the FM stereo receiver are entered;

a first fixed voltage source fixing a first current value;

a comparator for comparing said first current value with a second current value corresponding to said negative ripple components and supplying a current when said second current value exceeds said first current value;

a charging and discharging circuit to which a capacitor is connected;

a charging and discharging control circuit which produces a voltage responsive to the output current from the comparator and controls the discharge from said capacitor via said charging and discharging circuit in response to said voltage; and a level shifting circuit which controls the level of d.c. components from said S meter output voltage in response to the discharge of said capacitor and produces a high-cut and high-blend control voltage.

In a specific form of the invention, the in-phase amplifier comprises two transistors and forms a differential amplifier wherein the base bias of the transistor nearer to the entrance of the circuit is higher than the base bias of the transistor nearer to the exit of the circuit. Also, the charging and discharging control circuit is configured to control so that the discharging current of the capacitor becomes n times the output current of the comparator, and fix the first current value through the comparator to provide a dead zone.

Further, the high-cut and high-blend control voltage may be adjusted as desired, depending on the ratio of the output current of the comparator against the control current determining the discharge of the capacitor.

The invention will be better understood from the description given below, referring to some embodiments illustrated in the drawings.

DETAILED DESCRIPTION

Figure 1:
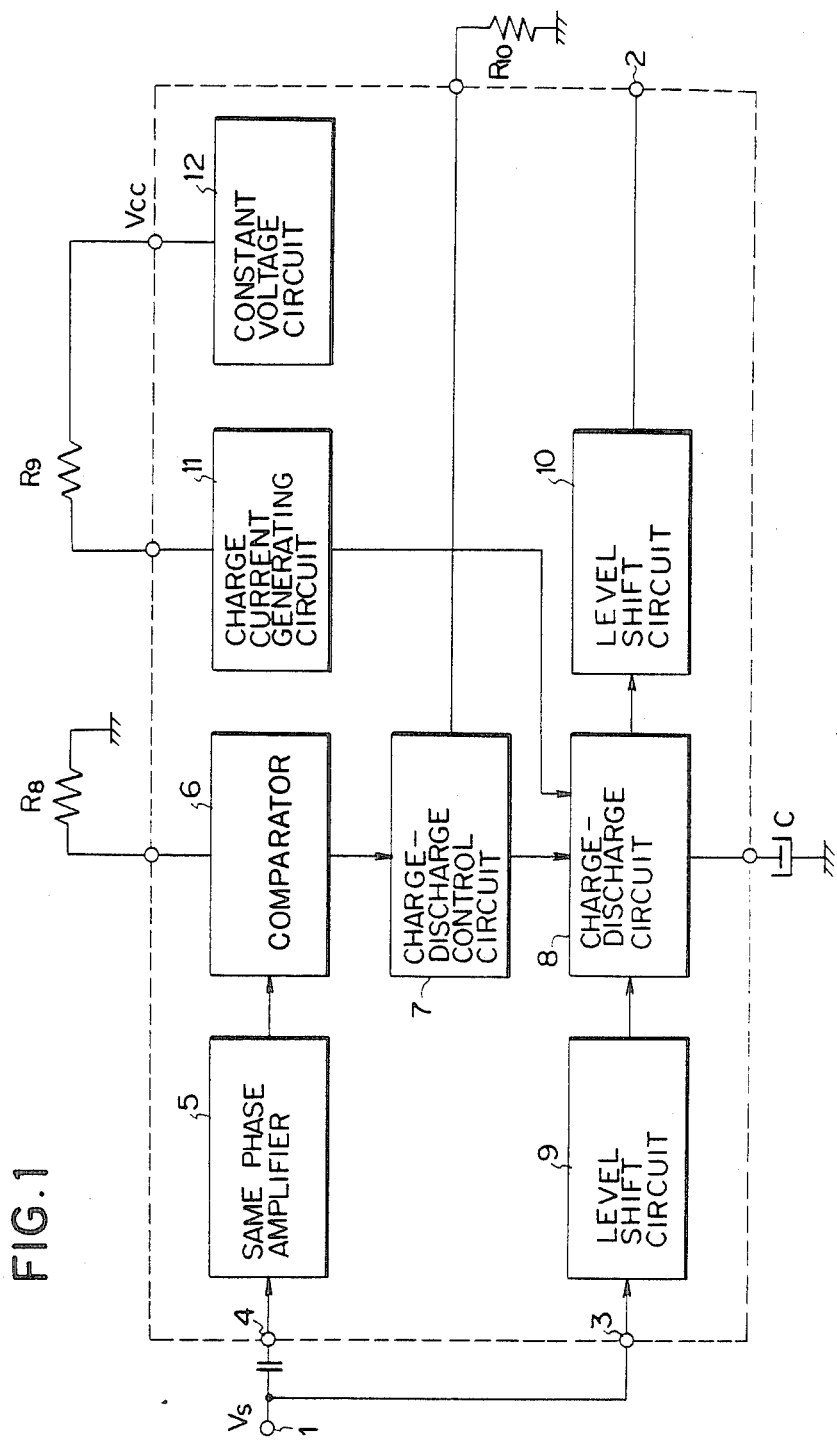
FIG. 1 is a block diagram of a control voltage generating circuit according to the present invention for activating a noise reduction circuit of an FM stereo receiver.

FIG. 1 is a block diagram of a control voltage generating circuit according to the invention for activating a noise reduction circuit in an FM stereo receiver. In the drawing, reference numeral 3 designates a d.c. input terminal, 4 refers to an a.c. input terminal, 5 to an in-phase amplifier, 6 to a comparator, 7 to a charging and discharging control circuit, 8 to a charging and discharging circuit for a capacitor C, 9 and 10 to level shifting circuits, 11 to a charging current generating circuit, and 12 to a fixed voltage circuit. As is in the prior art circuit, the invention circuit also uses the ripple components in an S meter output voltage for driving the S meter which indicates the reception sensitivity of the receiver. An output from a normal intermediate frequency amplifier IF of the FM stereo receiver FM is converted to a d.c. voltage by a not-illustrated d.c. converter. The d.c. voltage is used as an S meter output voltage and entered in the d.c. input terminal 3. The S meter output voltage is transmitted through the level shifting circuit 9, the charging and discharging circuit 8 responsive to the magnitude of the ripple components such as multipath noises and the level shifting circuit 10, and is applied to the d.c. output terminal 2. Therefore, when no multipath nor other ripple component exists, the voltage of the d.c. input terminal 3 appears at the d.c. output terminal 2 as it is. When any ripple components due to multipath noises exist in the S meter output voltage, the ripple component is extracted by a capacitor and applied to the comparator 6 through the in-phase amplifier 5. Since the major part of the multipath component is a negative ripple component, the in-phase amplifier 5 is configured to be simply responsive to negative ripple components and form a differential amplifier, for example. An input in the comparator 6 is compared therein with a current value fixed by a resistor $R_8$, so that the current (input) corresponding to the output of the in-phase amplifier 5 is outputted simply when the current is larger than the fixed current value. Therefore, a dead zone is produced by the resistor $R_8$. The charging and discharging control circuit 7 is responsive to the output current from the comparator 6 to generate a negative voltage corresponding to the magnitude of the ripple component in the multipath components. Since the charging and discharging circuit 8 is controlled by the negative voltage, the voltage entered in the d.c. input terminal 3 is reduced in level in response to the discharge from the capacitor C caused by the multipath or other ripple components, and the reduced voltage is transmitted to the d.c. output terminal 2, and outputted as a high-cut and high-blend control voltage.

Figure 2:
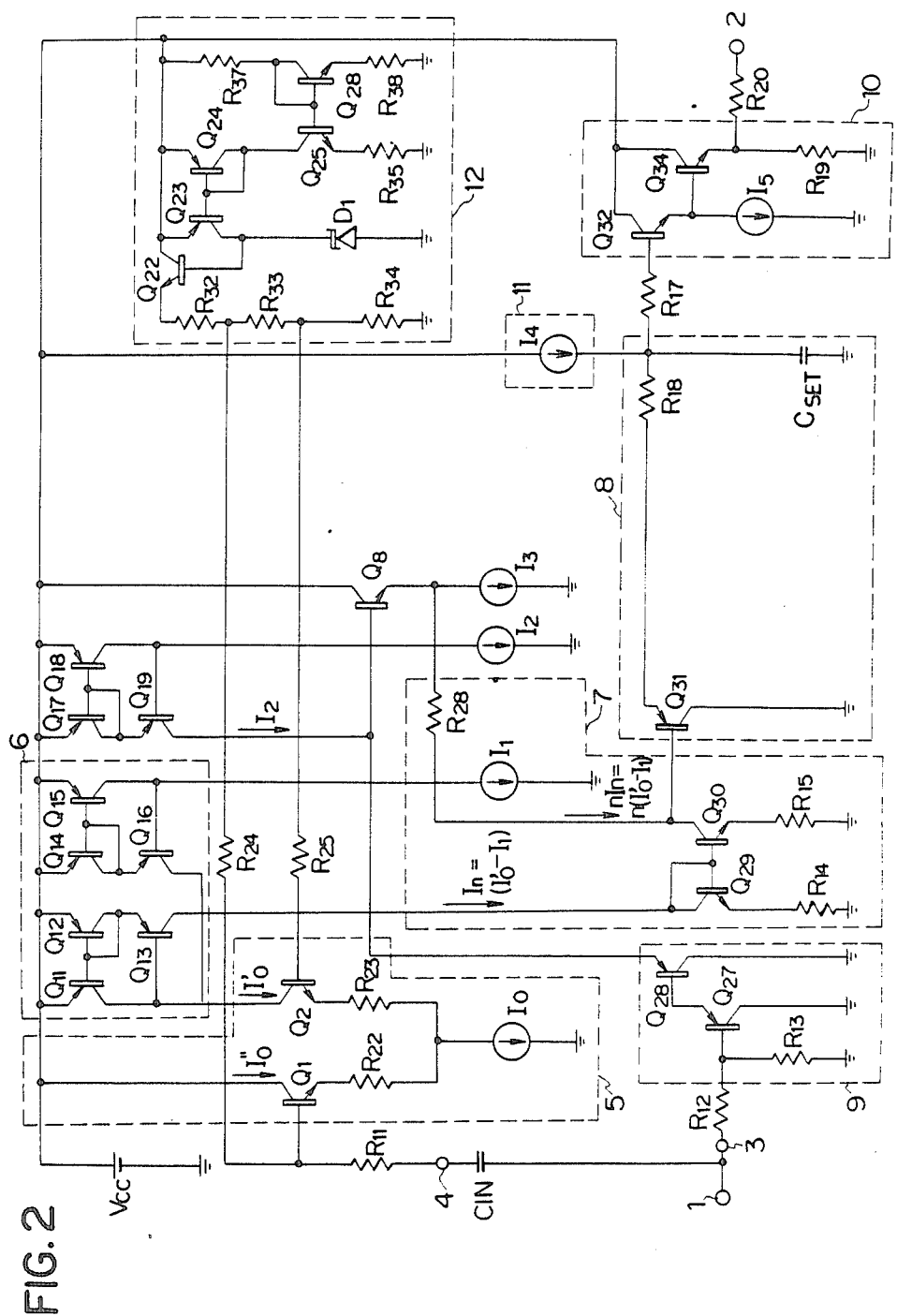
FIG. 2 is a specific arrangement of the circuit of FIG. 1.

FIG. 2 is a specific arrangement of the circuit of FIG. 1 wherein some circuit elements equal or equivalent to those of FIG. 1 are designated by the same reference numerals. The circuit of FIG. 2 operates as follows. When no multipath noise exists, the S meter output voltage $V_O$ is level shifted in PNP transistors $Q_{27}$ and $Q_{28}$, and further level shifted in NPN transistors $Q_{32}$ and $Q_{34}$. Subsequently, the voltage $V_O$ is outputted to the output terminal 2 as it is. That is, $$(V_O + V_{BE1} + V_{BE2} - V_{BE3} + V_{BE4} - V_{BE5} - V_{BE6}) \approx V_O$$

where $V_{BE1}$ through $V_{BE6}$ are base-emitter voltages of transistors $Q_{27}$, $Q_{28}$, $Q_8$, $Q_{31}$, $Q_{32}$ and $Q_{34}$, respectively, and $V_{BE1} = V_{BE2} = \ldots = V_{BE6}$.

When a negative ripple component, i.e. a multipath noise, exists in the S meter output voltage, the negative ripple component is entered through a coupling capacitor $C_{IN}$ in the differential amplifier made of a pair of transistors $Q_1$ and $Q_2$. The base bias of the transistor $Q_1$ is higher by a potential $\Delta V_B$ than the base bias of the transistor $Q_2$, in order to expand the linear region of the voltage-current conversion characteristic of the in-phase amplifier 5.

Figure 3A:
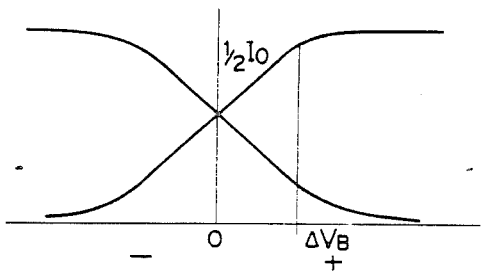
FIG. 3A and 3B show the characteristics of a differential amplifier at (a) and a waveform of an output voltage of an S meter at (b)
Figure 3B:
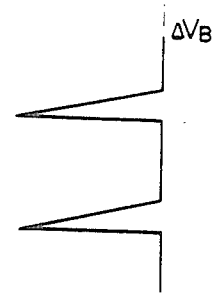

As shown in FIG. 3, the ripple component caused by the multipath noise included in the S meter voltage is negative. Therefore, when the difference between the base bias voltages of the transistors $Q_1$ and $Q_2$ is zero, the linear region of the voltage-current conversion characteristic of the in-phase amplifier 5 becomes ½ and degrades the dynamic range characteristic. To avoid this, the difference $\Delta V_B$ is provided between the base bias voltages of the transistors $Q_1$ and $Q_2$ so as to expand the linear region. When the negative ripple component is entered in the base of the transistor $Q_1$, the differential amplifier made of the transistors $Q_1$ and $Q_2$ amplifies an in-phase component. More specifically, when negative component is entered in the base of the transistor $Q_1$, the current through the transistor $Q_2$ increases, and the current through the transistor $Q_1$ decreases. Here, $$I'_O + I''_O = I_O$$

is established.

The current through the transistor $Q_2$ is the sum of a reference current $I_1$ and the current supplied from a current mirror circuit made of transistors $Q_{11}$, $Q_{12}$ and $Q_{13}$. In other words, the current $I_n$ does not flow when a negative ripple component is entered, and the current $I'_O$ through the transistor $Q_2$ is smaller than the reference current $I_1$. Therefore, no current is supplied to the current mirror circuit made of transistors $Q_{29}$ and $Q_{30}$, either. As the result, no voltage drop occurs in the resistor $R_{28}$ (capacitor $C_{set}$ does not discharge), and the S meter output voltage in the original form becomes a high-cut and high-blend control voltage.

As the ripple component increases so as to increase the current $I'_O$ through the transistor $Q_2$ beyond the reference current $I_1$, the transistor $Q_2$ invites a further current in addition to the reference current $I_1$, and a current $(I'_O - I_1)$ flows out through the collector of the transistor $Q_{11}$ of the current mirror circuit made of the transistors $Q_{11}$, $Q_{12}$ and $Q_{13}$. Therefore, due to a current mirror effect, a current $(I'_O - I_1)$ flows out from the collector of the transistor $Q_{13}$. This current $I_n = (I'_O - I_1)$ is increased n times by the proportion between the emitter resistances $R_{14}$ and $R_{15}$. That is, the current through the collector of the transistor $Q_{30}$ is n $(I'_O - I_1)$.

$$\frac{R_{15}}{R_{14}} \approx n$$

The current n $(I'_O - I_1)$ flows through the resistor $R_{28}$, causes a voltage drop $R_{28} n(I'_O - I_1)$. The base bias voltage of the transistor $Q_{31}$ drops by the amount accordingly. That is, Base bias voltage of
$Q_{31} = \{V_O + V_{BE1} + V_{BE2} - V_{BE3} - R_{28} \cdot n(I'_O - I_1)\}$ and the PNP transistor $Q_{31}$ becomes on. Therefore, the electric charge stored in the capcitor $C_{set}$ is discharged through the resistor $R_{18}$, and decreases the terminal voltage of the capacitor $C_{set}$. As the result, the control output voltage through the NPN transistors $Q_{32}$ and $A_{34}$ also drops and effect high-cut and high-blend operation.

The capacitor $C_{set}$, once discharged must be charged subsequently. To this end, a charging current $I_4$ is supplied to the capacitor $C_{set}$. The charging and discharging time constant, although it changes with the terminal voltage of the capacitor $C_{set}$, is represented by the following equation.

$$t_1 = \frac{C_{set}}{I_4} \cdot V_s$$

where $V_s$ is the terminal voltage of the capacitor $C_{set}$, and $I_4$ is the charging current.

Further, the discharging time constant is represented by $t_2 = C_{set} \cdot R_{18}$. For example, when $I_4 = 2.5 \mu A$, $C_{set} = 22 \mu F$, and $V_s = 1V$, $t_1 8.8$ seconds. When $R_{18} = 1k\mu$, $t_2 = 22$ms. Therefore, the charging time constant can be fixed to about 10 seconds with a relatively small capacitance of the capacitor $C_{set}$. Here, if the charging current $I_4$ may be selected as desired, the charging and discharging time constants can be fixed independently.

Since the in-phase amplifier 5 is used, the collector of the transistor $Q_2$ is not supplied with current upon plug noises. That is, the circuit of FIG. 2 is simply responsive to multipath noises.

Figure 4A:
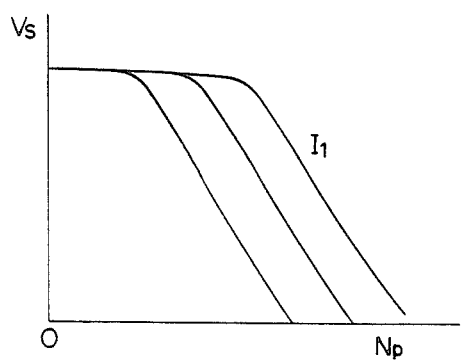
FIG. 4A and 4B show the characteristics of the circuit of FIG. 2.
Figure 4B:
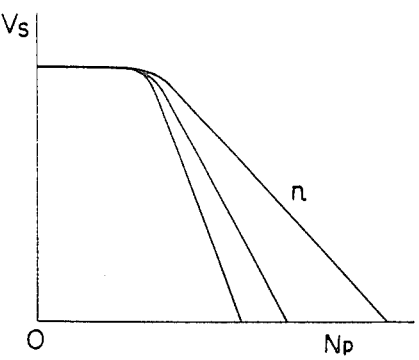
Figure 5:
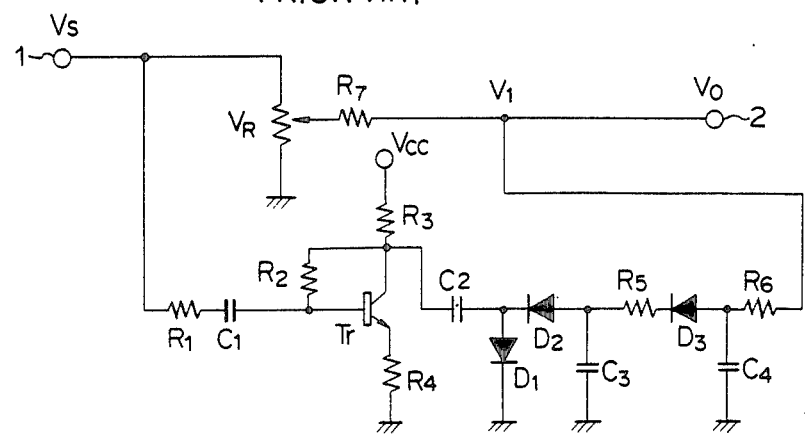
FIG. 5 is a prior art control voltage generating circuit for activating a noise reduction circuit.
Figure 6A:
FIGS. 6A and 6B show waveforms of an S meter output voltage.
Figure 6B:

FIG. 4(A) shows the relationship between the S meter output voltage $V_s$ and the amount $N_p$ of the multipath noises as a characteristic of the circuit of FIG. 2, taking the reference current $I_1$ as a parameter. FIG. 4(B) shows the relationship between the S meter output voltage $V_s$ and the multipath noise amount $N_p$ as a characteristic of the same circuit, taking $R_{15}/R_{14}=n$ as a parameter.

As described, according to the present invention, the control voltage generating circuit for activating a noise reduction circuit in an FM stereo receiver is simply responsive to multipath noises and never to plug noises, so that high band components are attenuated or removed simply on reception of multipath noises, so as to avoid any incompatibility in the reproduced sound. Further, in the invention circuit, a relatively long time may be selected as the charging time constant to establish a slow response of the circuit against a sudden change in the wave condition so as to provide a continuous sound quality. Additionally, appropriate selection of the reference current provides a circuit simply responsive to multipath noises beyond a predetermined level and much less liable to operate erroneously.

By adjusting $R_{14}/R_{15}=n$, the high-cut and high-blend control voltage may also be adjusted.

The embodiments of the invention in which an exclusive property or privilege is claimed are defined as follows:

1. A control voltage generating circuit for activating a noise reduction circuit in an FM stereo receiver which generates an S meter output voltage, comprising:
    an in-phase amplifier in which negative ripple components in the S meter output voltage are entered;
    a first fixed voltage source fixing a first current value;
    a comparator for comparing said first current value with a second current value which is produced by said in-phase amplifier and which corresponds to said negative ripple components, and for supplying an output current when said second current value exceeds said first current value;
    a charging and discharging circuit to which a capacitor is connected;
    a charging and discharging control circuit which produces a control voltage responsive to said output current from said comparator and controls a discharge from said capacitor via said charging and discharging circuit in response to said control voltage; and
    a level shifting circuit which controls the level of d.c. components from the S meter output voltage in response to the discharge of said capacitor and produces a high-cut and high-blend control voltage corresponding to said d.c. components.

2. A control voltage generating circuit of claim 1, wherein said in-phase amplifier is a differential amplifier which includes two transistors, the base bias of one of said transistors nearer to an input of said circuit being higher by a predetermined potential than the base bias of the other transistor nearer to an output of said circuit.

3. A control voltage generating circuit of claim 1 wherein said charging and discharging control circuit is configured to cause a current of said charging and discharging circuit which effects variation of said control voltage to be n times said output current of said comparator.

4. A control voltage generating circuit of claim 1 further comprising means for providing said circuit with a dead zone by adjusting said first current value flowing through said comparator.

5. A control voltage generating circuit of claim 1, wherein said comparator includes a current mirror circuit having a plurality of first transistors, and said charging and discharging control circuit includes two second transistors and includes first and second emitter resistors which are each connected to the emitter of a respective one of said second transistors, the rate of discharging of said capacitor being a function of the resistance proportion of said first and second emitter resistors for said second transistors.

* * * * *